Patented Mar. 8, 1927.

1,620,587

UNITED STATES PATENT OFFICE.

AUBREY C. WILLIAMSON, OF NEW ORLEANS, LOUISIANA, ASSIGNOR OF THIRTY-SIX PER CENT TO CHARLES E. SMITH AND TWENTY-FOUR PER CENT TO JAMES K. BAGLEY, BOTH OF NEW ORLEANS, LOUISIANA.

PLASTER COMPOSITION.

No Drawing.     Application filed April 25, 1925. Serial No. 25,928.

The invention relates to improvements in plaster compositions, having for an object to provide a composition plaster especially advantageous and efficient for usage in the building or surfacing of walls of attics, clothes or wardrobe closets, pantries, store rooms, vaults, or warehouses of residences, dwellings, factories, or commercial buildings, stores, or any other rooms or spaces utilized for the receiving or storing of clothing, furs, rugs, and similar articles apt to be damaged by the ravages of insects or vermin, the same being particularly and positively effective as an expellent and repellent for vermin, as for specific illustration, moths or *dermestidæ*.

It is likewise an object of the invention to provide a composition plaster which when "set" will provide an unusually hard and tough body and surface, but which may be amply porous to permit of the circulation of air over and through the same in a manner such as will facilitate the liberation and discharge of the insect and vermin expellent and repellent fumes.

Other objects of the invention will be in part obvious, and in part pointed out hereinafter.

For purposes of describing an exemplar form of the improved composition plaster, it may be stated that this composition may be practically produced by following the formula herein set out:

| | Per cent. |
|---|---|
| Aromatic cedar dust | 64 |
| Gypsum hard wall plaster | 33 |
| Pure red oxide (or other coloring matter) | 2 |
| Creosote of wood tar | 90/100 |
| Cedar leaf oil | 10/100 |

The ingredients as stated in the immediately preceding formula may be stated to be by weight as follows:

| | |
|---|---|
| Aromatic cedar dust | ½ pound to the quart (dry measure) |
| Gypsum hard wall plaster | 3½ pounds to the quart (dry measure) |
| Pure red oxide | 3½ pounds to the quart (dry measure) |
| Creosote of wood tar | 7 pounds to the gallon (liquid measure) |
| Cedar leaf oil | 7 pounds to the gallon (liquid measure) |

Ingredients set forth in the exemplar formula are preferably admixed in the order of their placement or statement herein, whereupon a sufficient quantity of water to render the resultant plastic composition of proper consistency for easy and practical working is added to the mass. The addition of water makes the composition, as will be understood, ready for working.

The gypsum wall plaster provides an effectual plaster and adhesive binder base for the composition plaster and with admixture of water thereto, upon setting, will crystallize, and thereby revert to the original state of its gypsum rock content, it being understood by workers skilled in the art that this particular form of wall plaster is manufactured or produced by driving off the water of crystallization from the gypsum rock. In consequence, when a sufficient amount of water is reintroduced thereinto, that is to say, an amount of water approximately corresponding to the amount driven off during calcination, the matter when applied to a surface, as above stated, will crystallize and revert to its original rock state. Thus, an exceedingly hard and tough body or surface is provided my improved composition, including the same.

Because of the incorporation of aromatic cedar wood dust in the proportion hereinbefore indicated, the composition will be afforded an excellent form of repellent and expellent to moths, *dermestidæ*, and other ravaging insects and vermin and in addition to this, such dust will produce a highly efficient form of reenforcing binder for the composition, making the walls constructed or surfaced of the same of greater inherent strength and toughness, as well as rendering the plastic body amply porous to permit of the circulation of air thereover and through the same whereby to facilitate liberation of cedar fumes from the same to act as an effectual insect or vermin repellent and expellent.

Through the addition of cedar leaf oil in the quantity indicated, the repellent and expellent qualities of the composition plaster are increased, it being understood in this connection that such oil will render the fumes given off by the composition materially more pungent.

Likewise, the addition of creosote wood tar to the composition plaster provides an additional repellent and expellent to insects and vermin, as well as providing the mass with an effectual deodorizer.

The amount or approximate amount of pure red oxide employed in the composition lends some coloring to the finished composition to resemble cedar wood. In this connection, it is of course to be understood that any other form of coloring may be substituted therefor, should a different finish or coloring be desired in the composition plaster, such as conditions or preference may dictate.

The improved composition plaster, with the addition of water to the desired amount to produce that consistency required, permits its usage in a manner corresponding to that of ordinary plaster, that is, the same being capable of being applied to walls to the desired thickness or depth with a trowel and then smoothed or troweled in the manner common in the art. Also, the composition can be applied over or directly to new or old gypsum wall plaster, lime, cement, hard walls, wood fibre, plaster of Paris, or to any other plaster now known and prevalent in the art, as well as to plaster board, wall board, sacket boards and plaster or stucco basis of all descriptions. Similarly, the composition, if desired, can be directly applied to the now widely used metal or wood lathing, to wood, brick, or building tile, and when so applied, will accord such base with an exceedingly hard and tough surfacing.

It has been found expedient in actual handling and usage of the improved composition that the same be manufactured and prepared for shipment in the following manner. The gypsum wall plaster, cedar dust, and pure red oxide, in dry state, are thoroughly admixed and packaged, while the liquid creosote wood tar and cedar leaf oil, are admixed and placed in a suitable liquid container which is sealed or otherwise suitably closed. The packages and containers thus packed may be shipped for marketing and when it is desired to produce the plastic mass in accordance with the invention hereinbefore described, the admixture of wood tar and cedar leaf oil is thoroughly mixed with the previously admixed dry materials, and water in a quantity such as to bring the resultant mass to workable consistency is added.

From the fore-going, it will be understood by workers skilled in the art that I have provided a simple but highly effectual form of composition plaster especially advantageous and practical for usage in surfacing walls or similar bases wherein it is desired to provide the same with an insect or vermin repellent and expellent, the composition with admixture of water thereto producing approximately the same amount of cedar oil and aroma as would natural cedar wood of the same thickness or dimensions. Also, because of the method of incorporating the cedar wood dust and cedar leaf oil, as well as the creosote wood tar in the plastic body, the pungent insect and vermin expellent and repellent odor will remain indefinitely with the plaster. Likewise, walls constructed or surfaced with the improved composition plaster will not warp, break or crack inasmuch as the composition is not affected by climatic variances and is also fire-proof.

In preparing the improved plaster composition, it will, of course, be fully appreciated by persons skilled in the art that the aromatic cedar dust employed may be in any form desired, such as cedar shavings or fibered cedar, the particular size of the cedar dust varying according to the desires of a user.

I claim:—

1. A plastic base and aromatic cedar wood dust distributed through said base whereby to render the same porous and vermin repellent.

2. A plastic base and aromatic cedar wood dust distributed through said base whereby to render the same porous and vermin repellent, and coloring matter to simulate the appearance of cedar wood.

3. A plastic composition comprising a plaster base, aromatic cedar matter, and a combined deodorizer and insect and vermin expellent and repellent.

4. A plastic composition comprising gypsum hard wall plaster, aromatic cedar wood dust distributed through said gypsum plaster whereby to render the same porous, and a combined deodorizer and insect and vermin expellent and repellent.

5. A plastic composition comprising a hard rock-like plastic base, aromatic cedar wood dust incorporated in and evenly distributed through said base whereby to render the same porous, and creosote of wood tar.

6. A plastic composition comprising a hard rock-like base, aromatic cedar wood dust incorporated in and distributed through said base, creosote of wood tar, and cedar leaf oil.

7. A plastic composition comprising a gypsum plaster material, aromatic cedar wood dust, creosote of wood tar, cedar leaf oil, and pure red oxide.

8. A plastic composition comprising a gypsum hard wall plaster material, thirty three per cent. aromatic cedar wood dust, sixty-four per cent, said dust being incorporated in and distributed through said material whereby with reducing of the same to plastic mass it will be rendered porous, creosote of wood tar ninety-one-hundredths per cent, cedar leaf oil, ten-one-hundredths per cent, and pure red oxide, two per cent.

9. A new article of manufacture comprising plaster having cedar sawdust incorporated therein to render the same vermin repellent.

In witness whereof I have hereunto set my hand.

AUBREY C. WILLIAMSON.